(12) United States Patent
Ito

(10) Patent No.: US 11,822,928 B2
(45) Date of Patent: Nov. 21, 2023

(54) INFORMATION PROCESSING APPARATUS, METHOD OF CONTROLLING SAME, STORAGE MEDIUM, AND IMAGE FORMING APPARATUS

(71) Applicant: CANON KABUSHIKI KAISHA, Tokyo (JP)

(72) Inventor: Yoshiharu Ito, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 16/583,668

(22) Filed: Sep. 26, 2019

(65) Prior Publication Data

US 2020/0110616 A1   Apr. 9, 2020

(30) Foreign Application Priority Data

Oct. 4, 2018 (JP) ................................. 2018-188996

(51) Int. Cl.
  *G06F 9/00* (2006.01)
  *G06F 15/177* (2006.01)
  *G06F 9/4401* (2018.01)
  *G06F 9/445* (2018.01)
  *G06F 11/14* (2006.01)

(52) U.S. Cl.
  CPC ............ *G06F 9/4401* (2013.01); *G06F 9/445* (2013.01); *G06F 11/1417* (2013.01)

(58) Field of Classification Search
  CPC ..... G06F 9/4401; G06F 9/445; G06F 11/1417
  See application file for complete search history.

(56) References Cited

U.S. PATENT DOCUMENTS 6,754,818 B1 *  6/2004  Lee ..................... G06F 9/4406
                                                        713/1
8,006,125 B1 *  8/2011  Meng ................. G06F 11/1417
                                                        714/6.2
(Continued)

FOREIGN PATENT DOCUMENTS

JP      2000-148467      5/2000
JP      2008-117148      5/2008
(Continued)

OTHER PUBLICATIONS

Office Action dated Aug. 23, 2022 in counterpart Japanese Application No. 2018-188996, together with English translation thereof.
(Continued)

*Primary Examiner* — Nitin C Patel
(74) *Attorney, Agent, or Firm* — Venable LLP

(57) ABSTRACT

It is an object of the present disclosure to improve robustness against an unintended alteration in data in a volatile memory. An information processing apparatus has a storage unit storing two or more boot programs; a determination unit configured to determine the validity of each of the boot programs; an information generation unit configured to generate volatile information; and a selection unit configured to extract the volatile information at random, selects one of the boot programs on a basis of the extracted volatile information, and in a case where the determination unit determines that the selected boot program is not valid and that another one of the boot programs is valid, perform a process of overwriting the selected boot program with the another boot program.

19 Claims, 4 Drawing Sheets

(56) References Cited

U.S. PATENT DOCUMENTS

| | | | | |
|---|---|---|---|---|
| 2005/0273588 A1* | 12/2005 | Ong | ............... | G06F 11/1417 |
| | | | | 713/2 |
| 2006/0155979 A1* | 7/2006 | Blinick | ............... | G06F 11/1417 |
| | | | | 713/2 |
| 2010/0245442 A1* | 9/2010 | Kasai | ............... | B41J 2/2142 |
| | | | | 347/14 |
| 2011/0022830 A1* | 1/2011 | Piwonka | ............... | G06F 11/1417 |
| | | | | 713/2 |
| 2013/0031413 A1* | 1/2013 | Righi | ............... | G06F 9/4408 |
| | | | | 714/37 |
| 2014/0089615 A1 | 3/2014 | Watanabe | ............... | 711/162 |
| 2015/0046717 A1 | 2/2015 | Hagiwara et al. | ............... | 713/187 |
| 2019/0005245 A1* | 1/2019 | Laffey | ............... | G06F 3/0679 |
| 2019/0303580 A1 | 10/2019 | Ito | ............... | G06F 21/572 |

FOREIGN PATENT DOCUMENTS

| | | |
|---|---|---|
| JP | 2009-070224 | 4/2009 |
| JP | 2010-026650 | 2/2010 |
| JP | 2012-243199 | 12/2012 |
| JP | 2015-036847 | 2/2015 |
| WO | 2017/188976 | 11/2017 |

OTHER PUBLICATIONS

Office Action dated Jan. 31, 2023 in counterpart Japanese Application No. 2018-188996, together with English translation thereof.

* cited by examiner

INFORMATION PROCESSING APPARATUS, METHOD OF CONTROLLING SAME, STORAGE MEDIUM, AND IMAGE FORMING APPARATUS

BACKGROUND OF THE INVENTION

Field of the Invention

The technique of the present disclosure relates to an information processing apparatus for starting an apparatus, a method of controlling the same, a storage medium, and an image forming apparatus.

Description of the Related Art

A non-volatile memory is usually used as a location to store a boot program, which is a program to start a system. Contents in this non-volatile memory are sometimes altered unintentionally. One of the causes is alteration of bits due to charge loss by aging deterioration of the non-volatile memory resulting from its physical defect. Another cause is rewrite of the program by an external malicious electronic attack.

Such an unintended alteration of the boot program causes problems such as failing to start the system and allowing the program rewritten by an attacker to operate simultaneously with the system's startup and leak information.

To avoid the occurrence of these problems and cause to the original boot program to operate, Japanese Patent Laid-Open No. 2010-26650 proposes a system that stores its boot program in a normally used non-volatile memory and also in another backup non-volatile memory. In a case where an unintended alteration is detected in the boot program stored in the normally used non-volatile memory, this system executes the other boot program, stored in the backup non-volatile memory.

SUMMARY OF THE INVENTION

The technique of the present disclosure provides an information processing apparatus comprising: a storage unit storing two boot programs containing an identical content; a verification unit configured to perform a verification on one of the two boot programs, stored in the storage unit; an execution unit configured to execute the one boot program determined not to have been altered by the verification; an overwrite unit configured to overwrite the one boot program determined to have been altered by the verification with the other of the two boot programs, stored in the storage unit; and an execution unit configured to execute the other boot program overwrite by the overwrite unit.

Further features of the present invention will become apparent from the following description of exemplary embodiments with reference to the attached drawings.

DESCRIPTION OF THE EMBODIMENTS

An embodiment of the technique of the present disclosure will be specifically described below with reference to the accompanying drawings. Note that the following embodiment does not limit the technique of the present disclosure according to the claims, and not all the combinations of the features described in the embodiment are necessarily essential to the solving means of the technique of the present disclosure.

Note that the description will be given by taking a multi function peripheral (digital multi function peripheral (MFP)) as an example of an image forming apparatus including an information processing apparatus according to the embodiment. However, the range of application of the technique of the present disclosure is not limited to multi function peripherals but includes information processing apparatuses and programs.

Figure 1:
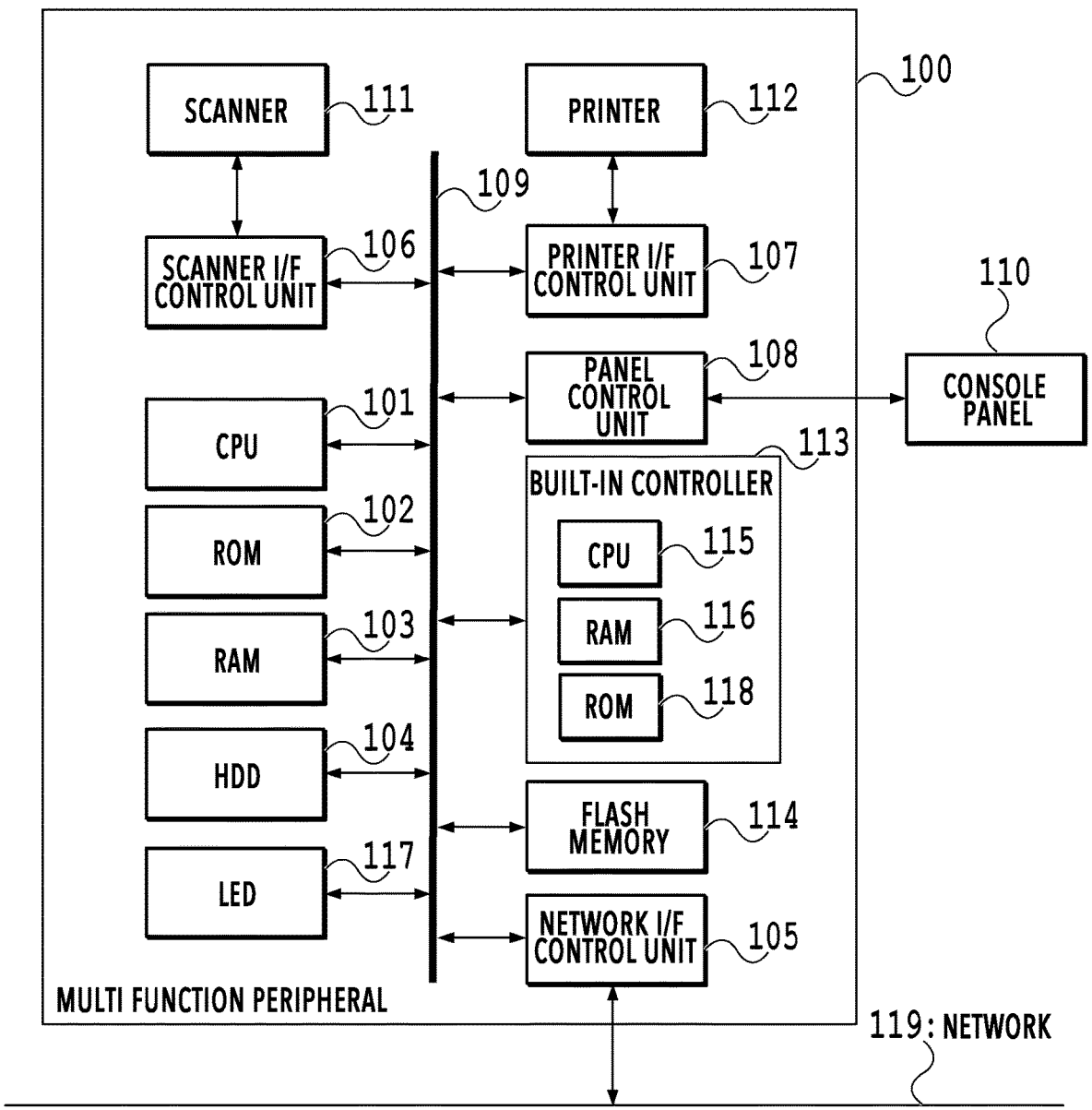
FIG. 1 is a hardware configuration diagram of a multi function peripheral.

FIG. 1 is a block diagram explaining the hardware configuration of a multi function peripheral 100 according to an embodiment of the technique of the present disclosure.

A CPU 101 executes software programs for the multi function peripheral 100 to control the whole apparatus. An ROM 102 is a read-only memory and stores a BIOS, fixed parameters, and so on of the multi function peripheral 100. An RAM 103 is a random-access memory and is used by the CPU 101 for storage of programs and temporary data and so on during control of the multi-function peripheral 100.

An HDD 104 is a hard disk drive and stores some applications and various pieces of data. A flash memory 114 stores a loader, a kernel, and an application.

A built-in controller 113 comprises a CPU 115, an RAM 116, and an ROM 118. The CPU 115 executes a software program for the built-in controller 113 to perform part of control of the multi function peripheral 100. The RAM 116 is a random-access memory and is used by the CPU 115 for storage of programs and temporary data and so on during control of the multi-function peripheral 100. The ROM 118 stores a program to be first read out when the CPU 115 starts operating.

A network I/F control unit 105 controls transmission and reception of data to and from a network 119. A scanner I/F control unit 106 controls scanning of documents by a scanner 111. A printer I/F control unit 107 controls print processing and the like by a printer 112. A panel control unit 108 controls a touchscreen-type console panel 110 to control display of various pieces of information and input of instructions from users.

A bus 109 connects the CPU 101, the ROM 102, the RAM 103, the HDD 104, the network I/F control unit 105, the scanner I/F control unit 106, and the printer I/F control unit 107 to each other. The bus 109 further connects the panel control unit 108, the built-in controller 113, and the flash memory 114 to each other. Control signals from the CPU 101 and data signals between apparatuses are transmitted and received through the bus 109.

An LED 117 is turned on where appropriate and is used to externally give notice of the occurrence of a software or hardware abnormality.

Figure 2A:
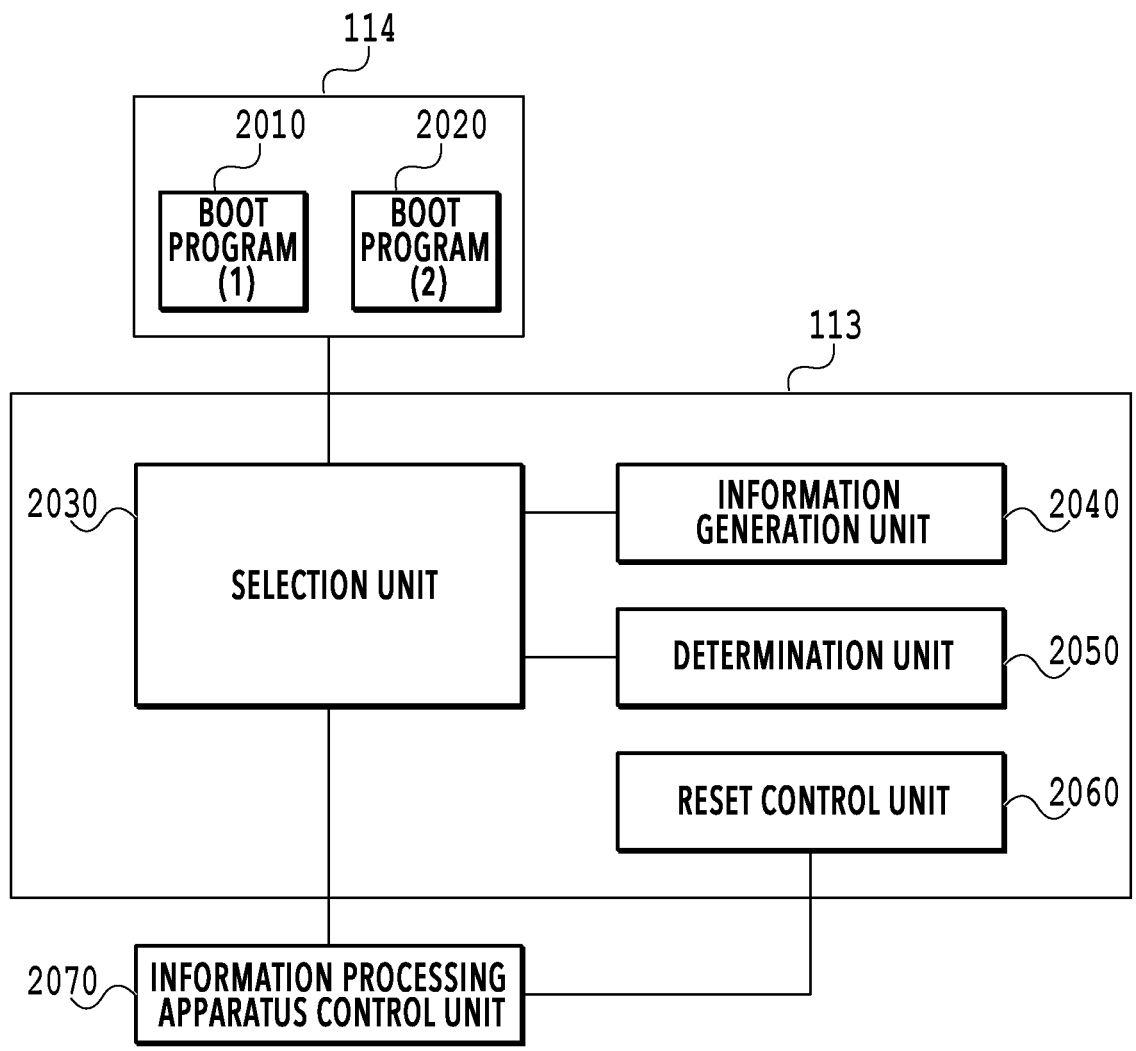
FIG. 2A is a block diagram explaining the functional configuration of a multi function peripheral 100 according to an embodiment of the technique of the present disclosure.

FIG. 2A is a block diagram explaining the functional configuration of the multi function peripheral 100 according to the embodiment of the technique of the present disclosure. The flash memory 114 stores a boot program (1) 2010 and a boot program (2) 2020. The built-in controller 113 includes a plurality of functions formed of a selection unit 2030, an information generation unit 2040, a determination unit 2050, and a reset control unit 2060 implemented by the CPU 115 executing programs stored in the RAM 116 and the ROM 118.

In FIG. 1, the built-in controller 113 and the flash memory 114 are connected by the common bus 109, but the configuration is not limited to this. Another bus that directly connects the built-in controller 113 and the flash memory 114 may be provided, and the built-in controller 113 may use it to read and write data from and to the flash memory 114 instead of using the bus 109.

The selection unit 2030 selects which one of the boot program (1) 2010 and the boot program (2) 2020, stored in the flash memory 114, is to be read out, on the basis of instructions from the information generation unit 2040 and the determination unit 2050.

The information generation unit 2040 generates information to be used by the selection unit 2030 to select the boot program. In the technique of the present disclosure, the information generation unit 2040 generates volatile information for selecting the boot program. In the present embodiment, the information generation unit 2040 has a random number generator (not shown) incorporated in or externally attached to the CPU 115. Upon start of the system, the information generation unit 2040 causes the random number generator to generate a random number and obtains a random number value via a predetermined process. The time from the generation to the obtaining of the random number value varies randomly due to the fluctuation of the rates of data read and data write from and to hardware such as a storage apparatus. This enables the information generation unit 2040 to obtain a value extracted at random at each startup. Note that the random number generator can be replaced with a counter that is monotonically incremented or the like, and a counting value can be used as the volatile information. Also, in the present embodiment, the information generation unit 2040 is assumed to generate the volatile information by means of hardware but may be configured to generate the volatile information by means of software.

The determination unit 2050 checks whether the boot program has been unintentionally altered. For this, the determination unit 2050 is assumed to use an electronic signature technique employing a common widely used public key encryption method. For this reason, detailed description about the method for checking will be omitted.

The reset control unit 2060 controls the state of operation of an information processing apparatus control unit 2070 to be described next. The initial state is a reset state which prevents the information processing apparatus control unit 2070 from operating.

The information processing apparatus control unit 2070 corresponds to the entirety of the multi function peripheral 100 excluding the built-in controller 113 and the flash memory 114. As mentioned above, the initial state of the reset control unit 2060 is the reset state. Thus, in this state, the information processing apparatus control unit 2070 does not start operating even if power supply starts.

Figure 2B:
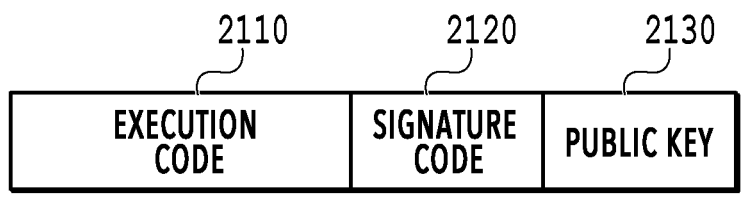
FIG. 2B is a diagram showing the logical configuration of a boot program.

FIG. 2B is a diagram showing the logical configuration of each boot program stored in the flash memory 114. As mentioned above, the boot program comprises not only a program body but also additional information since an electronic signature technique employing a public key encryption method is used to detect an unintended alteration. Execution code 2110 is the program body to be executed by the CPU 101. Electronic signature data including signature data 2120 and public key data 2130 is additional information necessary to determine the validity of the execution code 2110.

Figure 3:
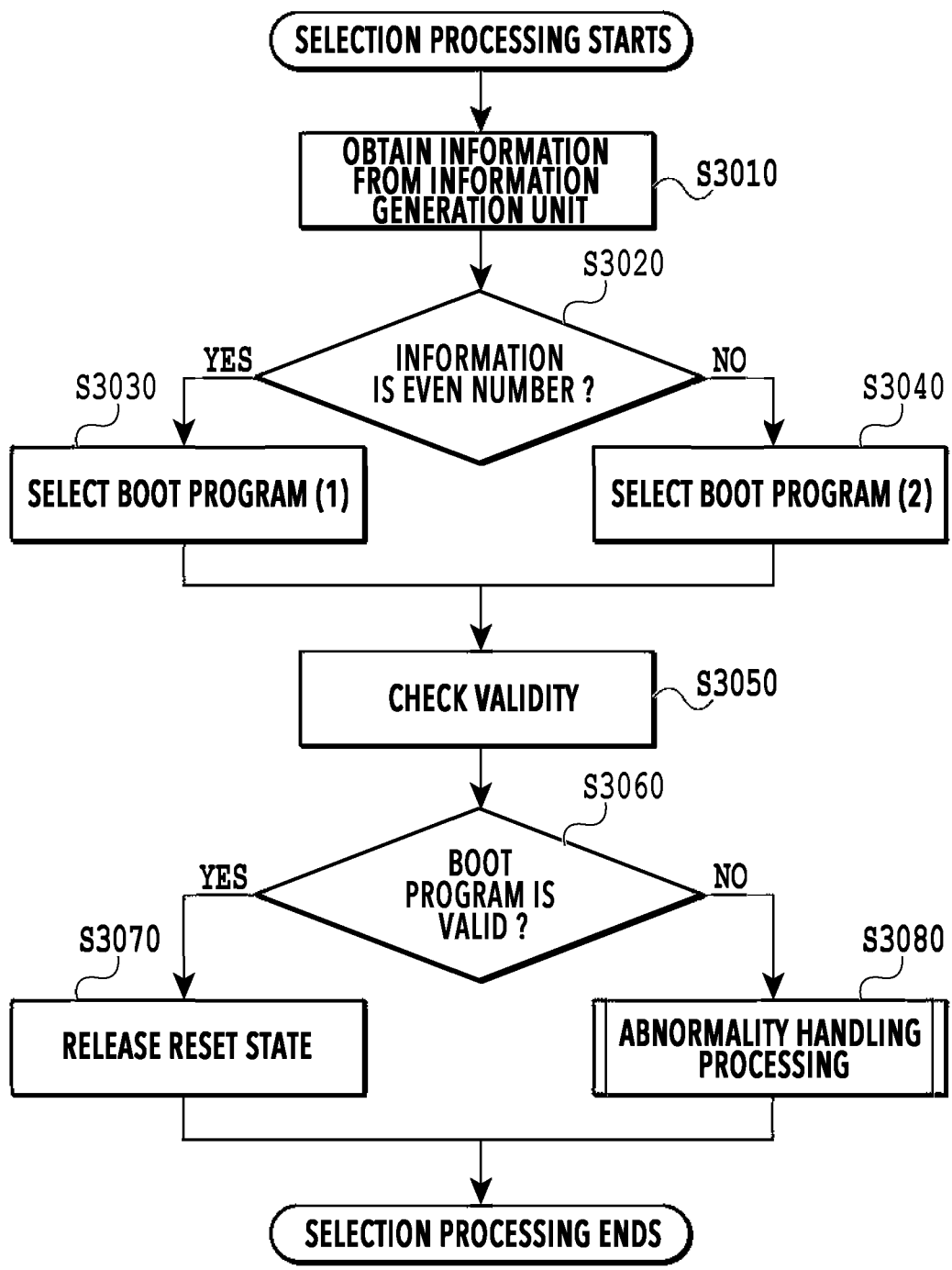
FIG. 3 is a flowchart showing selection processing according to the embodiment of the technique of the present disclosure.
Figure 4:
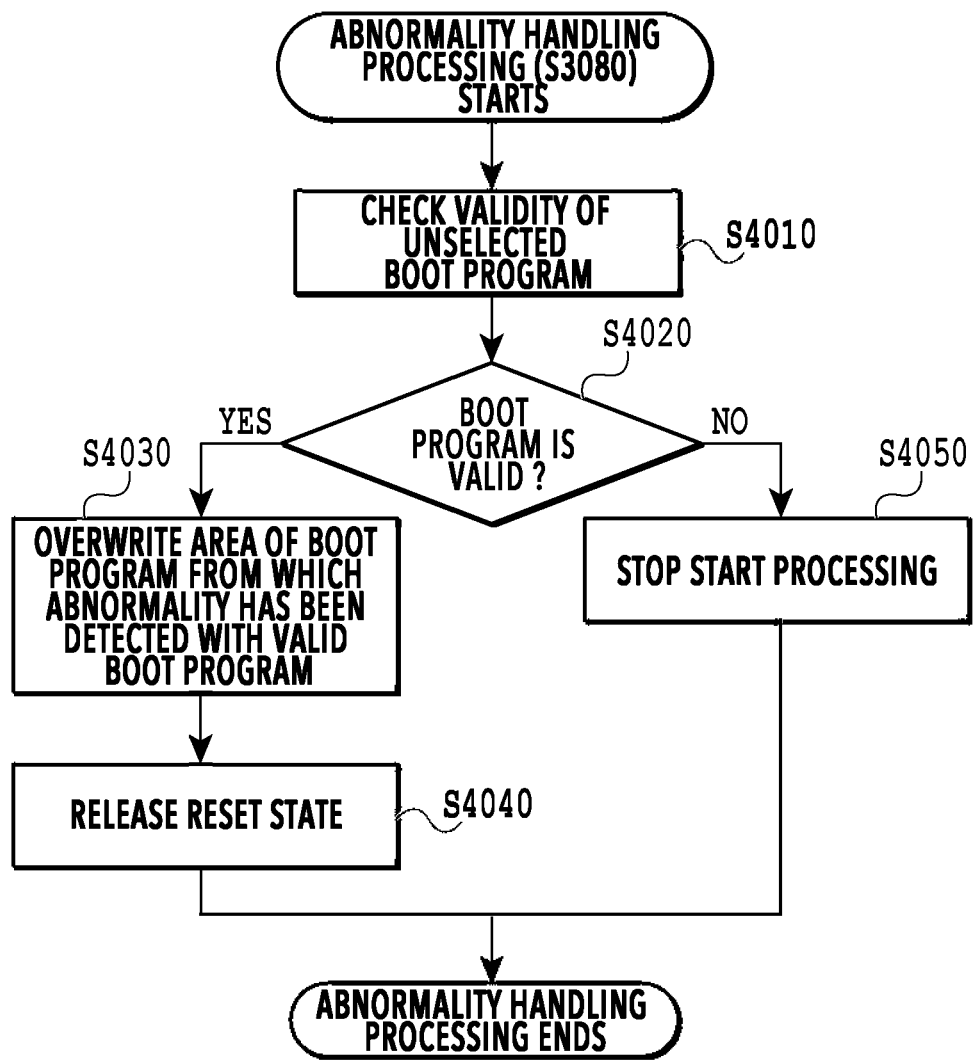
FIG. 4 is a flowchart showing abnormality handling processing according to the embodiment of the technique of the present disclosure.

FIGS. 3 and 4 are flowcharts showing selection processing and abnormality handling processing executed by the built-in controller 113 upon powering on the multi function peripheral 100 according to the present embodiment. The selection processing and the abnormality handling processing are stored in the form of software in the ROM 118 and executed by the CPU 115. Note that in the following description, functional units implemented by the CPU 115 on the basis of the functional configuration shown in FIG. 2A are entities that perform the operations in the steps.

FIG. 3 shows a flowchart showing the selection processing according to the embodiment of the technique of the present disclosure. Firstly in S3010, the selection unit 2030 obtains information from the information generation unit 2040. As described earlier, in the present embodiment, the information generation unit 2040 has a random number generating function, and the selection unit 2030 therefore obtains a random number value.

In S3020, the selection unit 2030 evaluates whether the obtained information, i.e., the random number value, is an even number or an odd number. In one example, if the random number value is an even number, the selection unit 2030 proceeds to S3030 and selects the boot program (1) 2010. If the random number value is an odd number, the selection unit 2030 proceeds to S3040 and selects the boot program (2) 2020.

Then in S3050, the selection unit 2030 causes the determination unit 2050 to check the validity of the selected boot program to determine whether the boot program has been unintentionally altered. As described earlier, the check is performed using an electronic signature technique employing a public key encryption method in the present embodiment, and therefore detailed description about the method for checking is omitted.

If determining in S3060 that the selected boot program is valid from the result of the validity check obtained from the determination unit 2050, the selection unit 2030 proceeds to S3070, in which it releases the reset state of the reset control unit 2060, and terminates the selection processing. After the reset state of the reset control unit 2060 is released, the information processing apparatus control unit 2070 reads out the selected boot program and starts operating.

On the other hand, if determining in S3060 that the selected boot program is not valid but is abnormal from the result of the validity check obtained from the determination unit 2050, the selection unit 2030 proceeds to S3080 and performs the abnormality handling processing.

FIG. 4 shows a flowchart explaining details of the abnormality handling processing according to the embodiment of the technique of the present disclosure. In the abnormality handling processing in S3080, firstly in S4010, the selection unit 2030 causes the determination unit 2050 to check the validity of the unselected boot program.

If determining in S4020 that the unselected boot program is valid from the result of the validity check obtained from the determination unit 2050, the selection unit 2030 proceeds to S4030 and overwrites the selected boot program with the boot program determined to be valid.

In S4040, the selection unit 2030 releases the reset state of the reset control unit 2060, and terminates the abnormality handling processing. After the reset state of the reset control unit 2060 is released, the information processing apparatus control unit 2070 reads out the selected boot program and starts operating.

On the other hand, if determining in S4020 that the unselected boot program is not valid but is abnormal from the result of the validity check obtained from the determination unit 2050, the selection unit 2030 proceeds to S4050 and stops the start processing. Since the reset state of the reset control unit 2060 has not been released, the information processing apparatus control unit 2070 does not start operating. In this process, the state of lighting of the LED 117 may be changed to give notice that the multi function peripheral 100 could not start operating.

In the above processing, at each startup, one of the plurality of boot programs is selected at random on the basis of volatile information. This enables balancing of the frequency of the validity check between the plurality of boot programs. By not distinguishing between the boot programs as a normally executed boot program and a backup boot program, it is possible to prevent a situation where detection of an unintended alteration in the backup boot program is delayed.

Note that in the above example, a description has been given of processing in which the information processing apparatus control unit 2070 is put in a state where it can refer to only one of the boot program (1) 2010 and the boot program (2) 2020 through the selection unit 2030. However, a similar advantageous effect can also be achieved even in a case where the information processing apparatus control unit 2070 selectively and directly reads out one of the boot program (1) 2010 and the boot program (2) 2020. In this case, when the information processing apparatus control unit 2070 starts operating, the information processing apparatus control unit 2070 may inquire of the selection unit 2030 about which one of the boot program (1) 2010 and the boot program (2) 2020 has been selected. Then, the information processing apparatus control unit 2070 may read out one of the boot program (1) 2010 and the boot program (2) 2020 on the basis of the response to the inquiry.

Also, in the above example, the boot program (1) 2010 and the boot program (2) 2020 are stored in the flash memory 114, but may be stored in different non-volatile memories.

Also, in the above example, a description has been given of processing in which only the built-in controller 113 starts operating upon power-on, and the information processing apparatus control unit 2070 starts operating after the selection processing shown in FIGS. 3 and 4 is performed. However, the built-in controller 113 may be omitted, and the CPU 101 in the information processing apparatus control unit 2070 may perform the selection processing shown in FIGS. 3 and 4. In this case, the processing shown in FIGS. 3 and 4 may be stored in the ROM 102, and the CPU 101 may be configured to always execute this processing when starting operating. In this way, a similar advantageous effect is achieved.

Also, in the above example, a description has been given of processing with two boot programs. However, the technique of the present disclosure is applicable also to a case where there are three or more boot programs. Such a configuration further improves robustness.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The technique of the present disclosure is capable of improving robustness against an unintended alteration in data in a volatile memory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188996, filed Oct. 4, 2018, which is hereby incorporated by reference wherein in its entirety.

What is claimed is:

1. An information processing apparatus comprising:
   a storage unit storing a plurality of identical boot programs;
   a processor executing a boot program by receiving a reset signal; and
   a controller unit executing a program different from the boot program when the information processing apparatus is started,
   wherein the controller unit, after executing the different program,
   (i) selects a first boot program from among the plurality of identical boot programs in accordance with a random number value,
   (ii) verifies whether the selected first boot program is a valid boot program based on certificate information,
   (iii) in a case where the selected first boot program is a valid boot program, causes the processor to execute the selected first boot program by sending the reset signal to the processor, and
   (iv) in a case where the selected first boot program is not a valid boot program, selects a second boot program from among the plurality of identical boot programs in accordance with the random number value and verifies whether the selected second boot program is a valid boot program based on the certificate information.

2. The information processing apparatus according to claim 1, wherein the information processing apparatus is a printing apparatus comprising a printing unit, and the plurality of identical boot programs are boot program to be used to start the printing apparatus.

3. The information processing apparatus according to claim 1, wherein
the controller unit, in a case where it is determined that the selected second boot program is not an altered boot program, overwrites the first boot program which is an altered boot program with the selected second boot program.

4. The information processing apparatus according to claim 3, wherein
the controller unit performs the overwritten boot program.

5. The information processing apparatus according to claim 1, wherein
the controller unit, in response to supplying power to the information processing apparatus executes the different program and selects the first boot program from among the plurality of identical boot programs in accordance with the random number value by executing the different program.

6. The information processing apparatus according to claim 1, wherein
the controller unit selects the first boot program from among the plurality of identical boot programs in accordance with whether the random number value is an even number or an odd number in response to starting of the information processing apparatus.

7. The information processing apparatus according to claim 1, further comprising:
a second storage unit storing the different program.

8. The information processing apparatus according to claim 1, wherein
the certificate information is electronic signature data, and each of the plurality of identical boot programs includes the electronic signature data.

9. The information processing apparatus according to claim 1, wherein
the controller, in a case where all of the plurality of the identical boot programs are not valid boot programs, stops the starting of the information processing apparatus.

10. An information processing apparatus comprising:
a storage unit storing two identical boot programs;
a processor executing a boot program by receiving a reset signal; and
a controller unit executing a program different from the boot program when the information processing apparatus is started,
wherein the controller unit, after executing the different program,
(i) selects one of the two identical boot programs in accordance with a random number value,
(ii) determines validity of the one boot program based on certificate information,
(iii) in a case where the one boot program is valid, sends the reset signal to the processor and causes the processor to execute the one boot program, and
(iv) in a case where the one boot program is not valid, selects the other of the two identical boot programs and determines validity of the other boot program based on the certificate information.

11. The information processing apparatus according to claim 10, wherein
the certificate information is electronic signature data, and each of the two identical boot programs includes the electronic signature data.

12. The information processing apparatus according to claim 10, wherein
the controller unit, in a case where the other boot program is valid, overwrites the one boot program which is not valid with the other boot program.

13. The information processing apparatus according to claim 12, wherein
the controller unit performs the overwritten boot program.

14. The information processing apparatus according to claim 10, wherein
the controller unit, in response to supplying power to the information processing apparatus executes the different program and selects the other of two identical boot programs in accordance with the random number value by executing the different program.

15. The information processing apparatus according to claim 10, wherein
the controller unit selects the first boot program from among the plurality of identical boot programs in accordance with whether the random number value is an even number or an odd number in response to starting of the information processing apparatus.

16. The information processing apparatus according to claim 10, further comprising:
a second storage unit storing the different program.

17. The information processing apparatus according to claim 10, wherein
the information processing apparatus is implemented in a print device, and
the two identical boot programs are boot programs for starting the print device.

18. The information processing apparatus according to claim 10, wherein
the controller, in a case where two identical boot programs are not valid boot programs, stops the starting of the information processing apparatus.

19. An information processing method for an information processing apparatus comprising a storage unit storing two identical boot programs and a processor executing a boot program by receiving a reset signal, the information processing method comprising:
(i) selecting one of the two identical boot programs in accordance with a random number value,
(ii) determining validity of the one boot program based on certificate information,
(iii) in a case where the one boot program is valid, sending the reset signal to the processor and causing the processor to execute the one boot program, and
(iv) in a case where the one boot program is not valid, selecting the other of the two identical boot programs and determining validity of the other boot program based on the certificate information.

* * * * *